United States Patent

[11] 3,629,698

[72] Inventor James J. Lamb
Sierra Vista, Ariz.
[21] Appl. No. 30,404
[22] Filed Apr. 21, 1970
[45] Patented Dec. 21, 1971
[73] Assignee The United States of America as represented by the Secretary of the Army

[54] MESOCAVITY SPECULAR INTEGRATOR REFRACTOMETER
4 Claims, 5 Drawing Figs.

[52] U.S. Cl. .................................................... 324/58.5 B,
356/5, 356/128
[51] Int. Cl. ......................................................... G01r 27/04
[50] Field of Search ............................................ 324/58 B,
58.5 B; 356/5, 107, 128

[56] References Cited
UNITED STATES PATENTS
3,446,559 5/1969 Astheimer et al. ............. 356/128

Primary Examiner—Edward E. Kubasiewicz
Attorneys—Harry M. Saragovitz, Edward J. Kelly and Herbert Berl ABSTRACT: A mesocavity specular integrating refractometer for measuring atmospheric refractivity consisting of a single-frequency coherent radio wave interferometer system of obtuse triangular configuration wherein a frequency stable continuous microwave transmitter located at the obtuse apex directs a microwave beam signal to a plane reflector at the most acute apex of the configuration which reflects and critically aims the microwave beam signal to the less acute apex where is located receiver means comprising a phase-lock loop receiver in combination with its slave receiver. The phase-lock loop receiver is phase-locked to the direct microwave beam signal and supplies locally generated oscillatory energy to the slave receiver for intermediate frequency conversion, detection and phase reference. The second receiver is oriented most favorably to the critically aimed reflected beam and has incorporated therein a phase comparator providing as an output a resultant difference voltage proportional to the phase angle between the intermediate frequency voltages of the second receiver which are derived from the direct and reflected microwave beams or signals. This output is a varying DC voltage directly proportional to variations in the atmospheric refractivity.

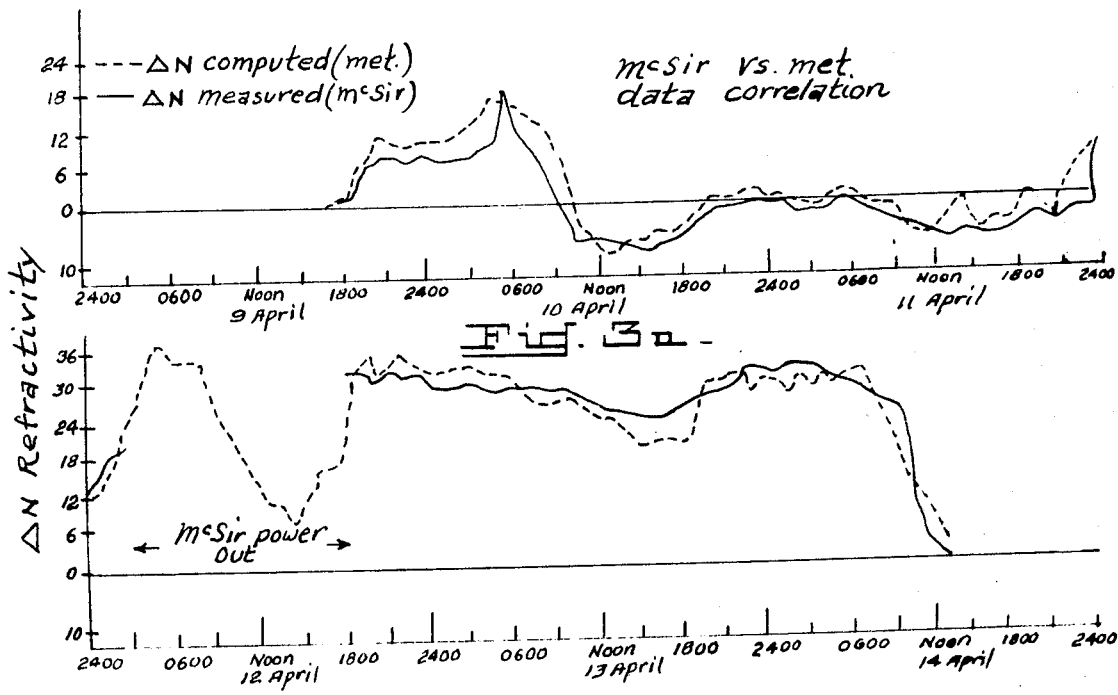
Fig. 3.
Fig. 3a.
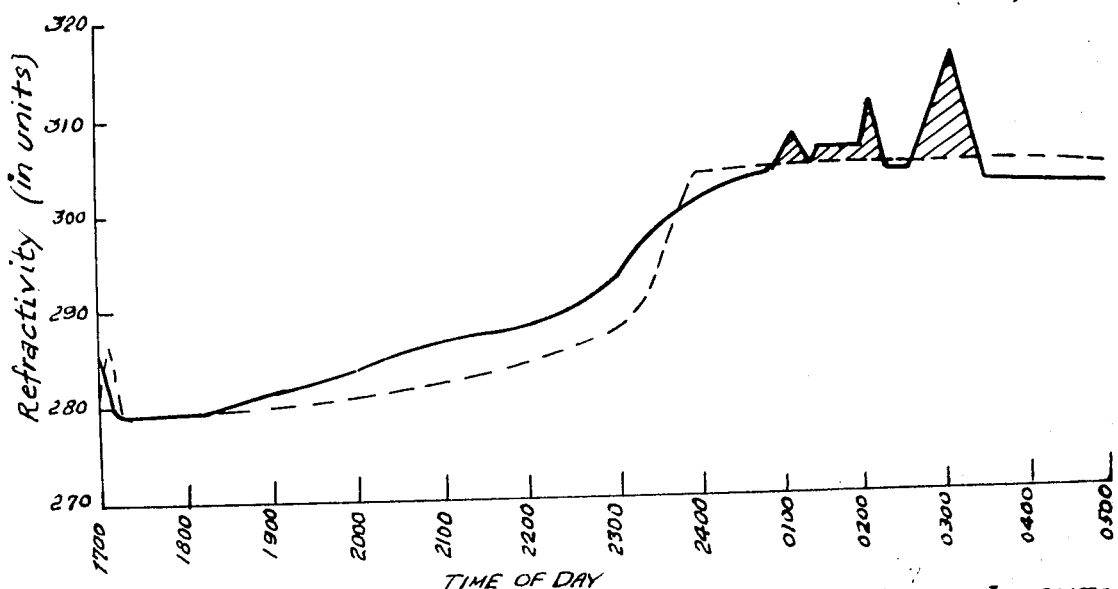
Fig. 4.

MESOCAVITY SPECULAR INTEGRATOR REFRACTOMETER

The invention described herein may be manufactured, used, and licensed by or for the Government for governmental purposes without the payment to me of any royalty thereon.

This invention relates to refractometers and methods for measuring atmospheric refractivity and more particularly to a refractometer for quantitative measurement of atmospheric refractivity in real-time.

The mesocavity specular integrating refractometer (McSIR) of the invention provides measurements of the integrated refractivity over the mesoscale path which are on an order of magnitude better than can be derived from point measurements using individual meteorological instruments or microcavity refractometers. The mesocavity specular refractometer of the instant invention accurately measures changes in refractivity of less than 0.5 N unit and shows sensitivity to variations as small as 0.1 N unit.

An object of the invention is a mesocavity specular integrating refractometer which provides much detail information on dynamic atmospheric characteristics involved in the continuous energy interchange, operating under all weather conditions as a remote probe over paths up to several miles long.

Another object of the invention is a mesocavity specular integrating refractometer wherein the nearly linear response thereof to water vapor component of refractivity makes it very useful in testing the calibration of hygrometric instruments which are unreliable at low humidity and are extremely nonlinear near saturation.

Another object of the invention is a mesocavity specular integrating refractometer wherein its dynamic refractivity indication provides a new and novel method for describing turbulent diffusion in a sample path of the atmosphere.

Another object of the invention is a mesocavity specular integrating refractometer employing an inherently coherent remote speculum terminal which is inexpensive compared to two-way coherent means such as coherent active transponders.

Another object of the invention is a mesocavity specular integrating refractometer for measuring rainfall rate.

A still further object of the invention is a mesocavity specular integrating refractometer for measurement of refractivity affecting tropospheric radio wave propagation.

The novel features that are considered characteristic of the invention are set forth with particularity in the appended claims. The invention itself, however, both as to its organization and method of operation as well as additional objects and advantages thereof will be best understood from the following description taken in conjunction with the accompanying drawings in the several figures of which:

Figure 1:
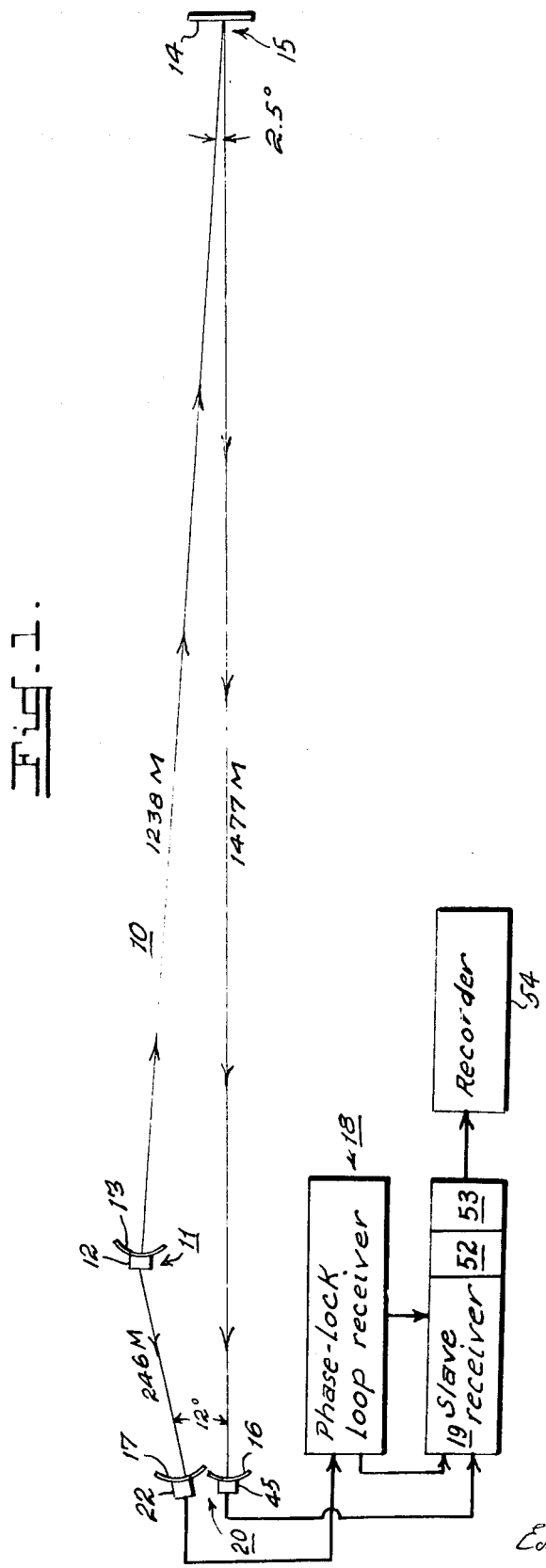
FIG. 1 is a diagrammatic representation of the mesocavity specular integrating refractometer of the invention.

FIGS. 3–3a comprise a graph showing an example of hourly samples of computed meteorological and measured mesocavity speculum integrating refractometer refractivity variation;

FIG. 4 is a graph indicating the sensitivity of the mesocavity specular integrating refractometer to the rate of rainfall. With reference to FIG. 1, there is shown an embodiment of the invention wherein an obtuse triangular configuration is employed as generally indicated by reference numeral 10. The interferometer illumination source at the obtuse apex 11 is a single-frequency highly-stable crystal-controlled solid-state transmitter 12 of rated 750-milliwatt output on 4 GHz. This power is fed to a 6-foot parabolic dish antenna 13 and directed with forward gain of 33 db. and a beam width of 3°, main lobe, down range 1,238 meters to the 24 square foot passive speculum 14 located at the acute apex 15. Passive speculum 14 has a two-way gain of 77 db. and a reflected main lobe width of 2.5°. The included incidence to reflection horizontal angle for the main lobe is approximately 2.5°. The reflected main lobe radiation is precisely aimed back to the 1,477-meter distant receiving parabolic dish antenna 16 at the third apex 20. Simultaneously, the weaker but quite coherent back lobe radiation of the transmitter parabolic dish antenna 13 is picked up over the relatively short distance path of 246 meters by the parabolic dish antenna 17 of the phase-lock loop receiver or reference receiver 18 which is also located at the third apex 20 of the triangular configuration 10.

The transmitter antenna 13, reflector or passive speculum 14, and receiver means antennas angular relationship is chosen so that the reference or phase-locked loop receiver 18 parabolic antenna 17 has its main lobe most favorably directional to the back lobe radiation of the emitter or transmitter parabolic antenna 13 and a side null directional to the reflected beam from the distant reflector or speculum 14; while the parabolic antenna 16 of slave receiver 19 has its main lobe most favorably directional to the reflected beam from the reflector or speculum 14 and its side null directional to the emitter or transmitter parabolic antenna 13. I have found that an angle of approximately 12 to 14° between the beam axes of the parabolic receiving antennas 16 and 17 provides a desired to undesired signal power ratio of more than 1,000 or 30 db. in each receiver in the system configuration as set forth in the foregoing.

Atmospheric refractivity variation is additive in the ten times longer two-way path from transmitter 12 to reflector or speculum 14 and back to the plane of the transmitter 12 site. However, the refractivity variation essentially cancels in the converging short path from the transmitter 12 to phase-lock loop receiver parabolic antenna 17, and the nearly equal portion of the return path between the transmitter 12 site plane and slave receiver parabolic antenna 16. Further, I have found that variation in received signal strength has no measurable effect on the accuracy of refractivity measurements.

Figure 2:
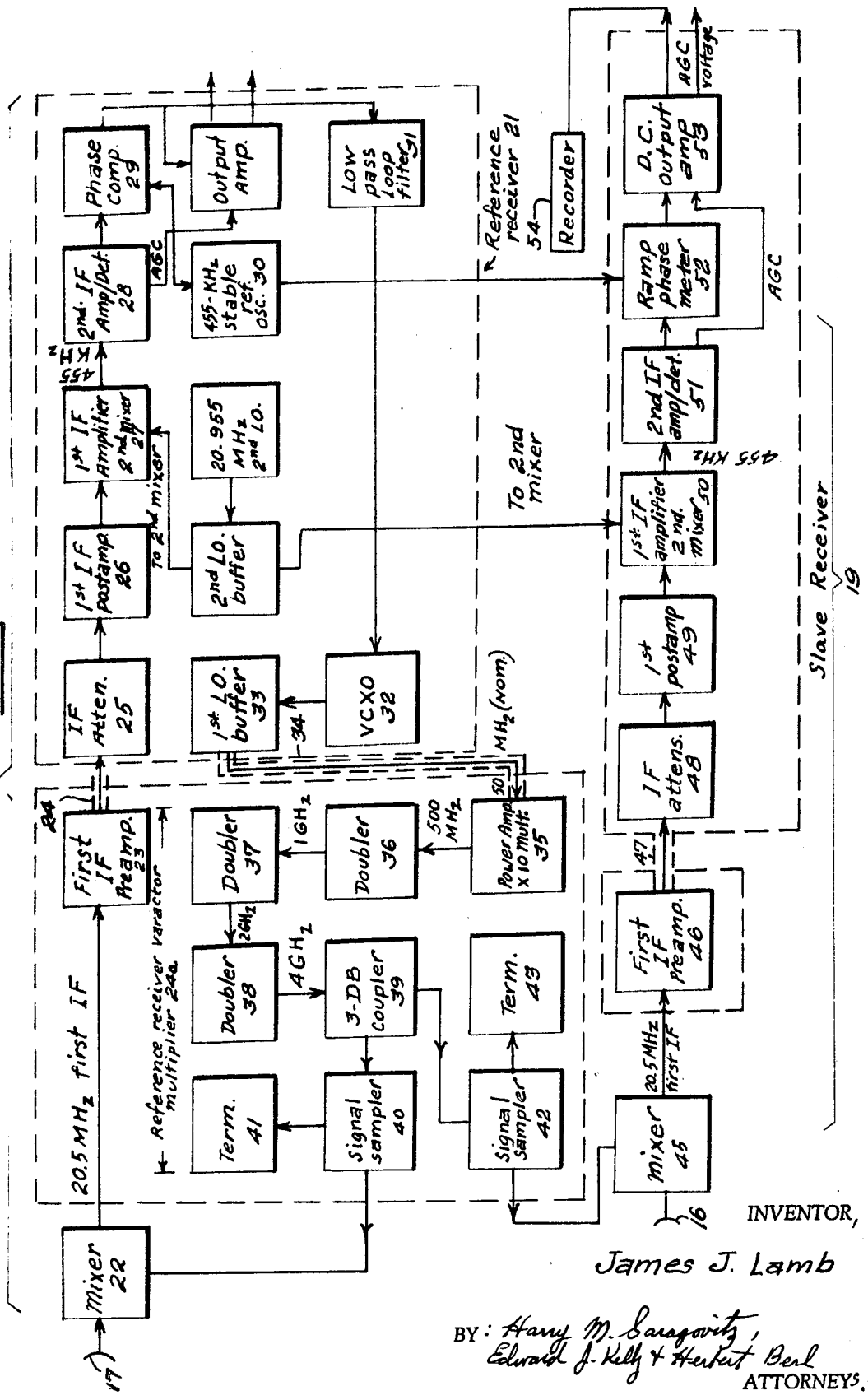
FIG. 2 is a block diagram illustrating the radio receiver means employed in the invention.

Coherence is the essence of the mesocavity specular integrating refractometer and is obtained by the inherent coherence of the passive reflector or speculum 14 and the functional receiver configuration illustrated in FIG. 2 and subsequently described herein. The passive reflector or speculum simply reverses the phase exactly 180° without delay. Briefly the functional receiver 18 configuration comprises the phase-lock loop receiver which is phase-locked to the transmitter 12 and supplies coherent first and second local oscillator and reference voltages through buffers to slave receiver 19. Thus the unique independent variable is phase difference between the transmitted and received waves. This phase difference is equal to variation in refractivity of the intervening atmosphere.

The output phase variation is directly related to refractivity as follows:

$$\Delta\Phi/_{R} = (2\pi/\lambda \times \Delta n \times 2L_{P}$$

where $\Delta n$ is the refractive index, increment practically $1 \times 10^{-6}$, and the wavelength $\lambda$ for 4 GHz. is 7.5 cm.

Path length, $L_{P} = 1,238 \times 10^{5}$ cm one way for the experimental configuration of FIG. 1.

For $\Delta n = 1 \times 10^{-6}$ or 1 $N$ unit, $\Delta\Phi/n = (2/7.5) \times 10^{-6} \times 2,476 \times 10^{5}$ Since $2\pi$ radians $= 360°$ $\Delta\Phi/N = (360/7.5) \times 10^{-6} \times 2.476 \times 10^{5}$ $= (360/75) \times 2.476$ $= 11.88°/N$ unit or, practically, $12°/N$ unit Thus — $360° = 30$ $N$ units Variation in path length of 1 wavelength of 7.5 cm. or 3 inches equals a phase variation of 360°. Since 360° phase variation equals 30 $N$ units variation in refractivity, a 1 inch path length change equals 10 $N$ units and a 0.1 inch equals 1 $N$ unit or 12° phase variation. A variation of 0.01 inch equals only 0.1 $N$ unit change in refractivity. I have found that this mechanical variation tolerance is met and maintained by ordinary construction precautions. In proof of this tolerance comparison of refractivity variation calculated from meteorological measurements of atmospheric pressure, temperature and humidity with the concurrently recorded data of the mesocavity specular integrating refractometer demonstrate remarkably good correlation for periods of several days and longer.

Refractivity, $N$, is a convenient measure of atmospheric radio refractive index, $n$, the latter being the ratio of the velocity of an electromagnetic wave in vacuum to its actual velocity in the atmosphere. $N=(n-1)\ 10^6$ and has typical surface values ranging from 325 to 225 at 5,000 foot altitude above mean sea level. It is calculated from meteorological data by the well known Smith-Weintraub formula, $N=77.6P/T+373,000eT^2$, where $N$ is refractivity in $N$ units, $P$ is barometric pressure in millibars, $T$ is temperature in °K. and $e$ is the partial pressure of water vapor in millibars.

One example of the correlation of the mesocavity specular integrating refractometer (McSIR) real-time data and the refractivity calculated from meteorological measurements is shown graphically in FIG. 3. This graph is a plot of hourly samples of computed meteorological and measured McSIR refractivity variation for the period 9–14 Apr. 1967. Digital computer calculations for these data showed a linear correlation function of 0.982 for the 55 hourly data points.

The sensitivity of the McSIR to rate of rainfall is indicated in the graph of FIG. 4 in which the dashline curve is plotted for refractivity calculated from concurrent temperature, barometric pressure and dewpoint readings, while the solid curve is from McSIR refractivity measurements. The shaded areas show the increment of refractivity attributable to especially heavy rainfall during several short periods when maximum refractivity due to 100 percent humidity conditions was exceeded.

The McSIR receiving system consists of two receivers generally indicated by reference numeral 18, the phase-locked loop receiver, and numeral 19, the slave receiver, connected to form a single receiver with coherent channels. FIG. 2 is a detailed block diagram broken down into functional modules as they appear in the receiver. The units inclosed in dashed lines are located in separate units or receiver racks. The reference receiver 21 is a phase-lock subsystem operating with a phase-stable input signal at 3.995 GHz. received by parabolic antenna 17 from a back lobe of radiation from parabolic transmitting antenna 13. This signal is mixed in the local oscillator-mixer 22 and down converted therein to 20.5 MHz. and amplified in the IF preamplifier 23. The mixer 22 is coupled to antenna 17 and first IF preamplifier 23 and the modules comprising the reference receiver varactor multiplier 24 are mounted on a rack adjacent antenna 17.

The 20.5 MHz. output signal from IF preamplifier 23 is fed down a long coaxial cable 24 to a receiving shelter, not shown, attenuated by means of attenuator 25, amplified in the first IF post amplifier 26 and then down converted in the module identified as the first IF amplifier and second mixer 27 to 455 kHz. The 455 kHz. signal is then filtered in the second IF amplifier module 28 and further amplified. The output of the second IF amplifier module 28 is applied to one input of phase comparator 29 where it is compared with the signal from the very stable reference oscillator 30. The difference in the form of the output phase error signal at the output of phase comparator 29 is applied to the loop input where it is filtered by loop filter 31 and fed back to the voltage-controlled crystal oscillator 32. This filtered phase error adjusts the frequency and phase of the voltage-controlled crystal oscillator 32 to provide a constant phase difference between the multiplied output and the received signal. Thus the voltage-controlled crystal oscillator 32 tracks the received signal phase and is maintained in constant phase relationship with the transmitted signal.

The approximately 50 MHz. output of the voltage-controlled crystal oscillator 32 is amplified in the first local oscillator-buffer module 33 and then fed through a coaxial cable 34 to the varactor multiplier down converter 24a located at the receiving parabolic antenna 17. The actual frequency in this case is 50.25 MHz. which is amplified and multiplied by a factor of 10 to provide an output of 502.5 MHz. by means of multiplier module 35. The 502.5 MHz. output of module 35 is doubled by means of doubler 36, doubled again by means of doubler 37 and doubled a third time to 4 GHz. by means of doubler 38. Thus the 50.25 MHz. voltage-controlled crystal oscillator 32 is multiplied 80 times to provide phase-locked first local-oscillator (module 33) voltage at 4.02 MHz.

The output of the 4 GHz. doubler 38 is applied to the input of a 3 db. coupler 39 which splits the power equally providing two equal power outputs. One of the outputs is fed through signal sampler 40 via means of one of its output terminals to a termination 41 and another output terminal thereof is coupled to mixer 22, thus closing the phased-locked loop.

The other output of coupler 39 is coupled by means of signal sampler 42 to a terminal 43 and also to mixer 45 of slave receiver 19 where it mixed with the 3.995 GHz. signal from slave parabolic antenna 16, providing a coherent signal output at the intermediate frequency of 20.5 MHz. This slave mixer output signal is fed into the IF preamplifier 46 located in the chassis unit mounted on the back of the slave parabolic antenna 16. The output of preamplifier 46 is fed down a long coaxial cable 47 to the adjustable IF attenuator 48, through postamplifier 49, first IF amplifier and second mixer module 50 providing coherent output to the second 455 kHz. IF amplifier (Module 51). The respective circuits of each of these modules are similar to those in reference receiver 21. As is well known in the art, the process of successively mixing or heterodyning maintains coherence and thus preserves the original phase information (such as phase velocity variation due to atmospheric refractive index changes) through to the output of 455 kHz. IF amplifier of module 51.

The amplified 455 kHz. output of the IF amplifier of module 51 is applied to the signal input of ramp phasemeter 52 and the phase angle difference between the two received signals is read out as an output from ramp phasemeter 52. This output is a varying DC voltage proportional to the electrical angle variation in degrees, such that a range of from 0–3.6 volts corresponds linearly to successive ranges from 0 to 360°. Thus the DC output is directly proportional to variations in atmospheric refractivity. The aforementioned DC output is coupled by means 54 of DC amplifier 53 to, for example, a magnetic recording means for recording the varying DC voltage.

I claim:

1. A mesocavity specular integrating refractometer for measuring atmospheric refractivity comprising in combination:

a single-frequency coherent radio wave interferometer of obtuse triangular configuration;

a microwave generator for generating a frequency stable continuous microwave signal coupled to a directional beam emitter which is positioned at the obtuse apex of the triangular configuration and oriented to aim a direct microwave beam signal toward the most acute apex of the triangular configuration;

a passive plane reflector positioned at the most acute apex of said triangular configuration and oriented to reflect and critically aim said direct microwave beam signal toward the less acute angle of said triangular configuration;

a coherent radio receiver means consisting of a superheterodyne phase-lock loop receiver locked in phase with the direct microwave beam signal and a superheterodyne receiver comprising a slave receiver coupled to the superheterodyne phase-lock receiver;

a first parabolic antenna coupled to the input of the phase-lock loop receiver and oriented in a direction most favorably to the incidental rearward radiation of the direct microwave beam signal by said emitter and least favorably directional to the critically aimed reflected microwave signal whereby said direct microwave signal is applied to the input of the said phase-lock receiver;

a second parabolic antenna coupled to the input of said slave receiver and oriented in a direction most favorably directional to critically aimed reflected microwave signal and least favorably to said incidental rearward radiation whereby said reflected microwave signal is applied to the input of said slave receiver;

said superheterodyne phase-lock receiver locked in phase to said direct microwave signal from said emitter by phase-lock loop circuit means therein and supplying coherent locally generated oscillatory energy to said slave receiver for microwave signal to intermediate frequency conversion, detection and phase reference;

a phase comparator coupled to the output of said slave receiver providing a resultant difference voltage proportional to the phase angle between intermediate frequency voltages in said slave receiver derived from the direct and reflected microwave signals, said difference voltage representing variation of the phase velocity of said reflected signal due to changes in refractive index in the two-way space path intermediate the emitter and plane reflector; and, recording means coupled to the output of the phase comparator for recording the difference voltage variations.

2. The invention in accordance with claim 1 wherein the beam axes of said first and second parabolic antennas are spaced with respect to one another at an angle of 12 .

3. The invention in accordance with claim 2 wherein at the most acute angle of said triangular configuration, the included incidence to reflection angle for the main lobe of the plane reflector is approximately 2½°.

4. The invention in accordance with claim 3 wherein the direct distance between said beam emitter and said passive reflector is approximately 10 times greater than the direct distance between said beam emitter and said coherent receiver means.

* * * * *